(12) United States Patent
Norgren et al.

(10) Patent No.: US 9,096,916 B2
(45) Date of Patent: Aug. 4, 2015

(54) ALUMINIUM BRAZING SHEET WITH A HIGH STRENGTH AND EXCELLENT CORROSION PERFORMANCE

(75) Inventors: Stefan Norgren, Finspång (SE); Linda Ahl, Svärtinge (SE)

(73) Assignee: SAPA HEAT TRANSFER AB, Finspång (SE)

( * ) Notice: Subject to any disclaimer, the term of this patent is extended or adjusted under 35 U.S.C. 154(b) by 635 days.

(21) Appl. No.: 13/262,843

(22) PCT Filed: May 12, 2010

(86) PCT No.: PCT/SE2010/050526
§ 371 (c)(1),
(2), (4) Date: Oct. 26, 2011

(87) PCT Pub. No.: WO2010/132018
PCT Pub. Date: Nov. 18, 2010

(65) Prior Publication Data
US 2012/0070681 A1 Mar. 22, 2012

(30) Foreign Application Priority Data
May 14, 2009 (SE) ...................................... 0950340

(51) Int. Cl.
*B32B 15/01* (2006.01)
*B32B 15/04* (2006.01)
(Continued)

(52) U.S. Cl.
CPC ................. *C22C 21/10* (2013.01); *B32B 15/01* (2013.01); *B32B 15/016* (2013.01); *B32B 15/04* (2013.01);
(Continued)

(58) Field of Classification Search
CPC ........ C22C 21/00; C22C 21/06; C22C 21/08; C22C 21/10; B32B 15/01; B32B 15/016; B32B 15/043; B32B 15/20; B32B 2311/24; B32B 15/04; B32B 30/00; B32B 30/005; C23C 30/00; C23C 30/005; Y10T 428/12764; Y10T 428/12063; Y10T 428/12438; Y10T 428/12736; Y10T 428/2495; Y10T 428/24967
USPC ......... 428/553, 654, 213, 215, 220, 332, 334, 428/335, 336
See application file for complete search history.

(56) References Cited

U.S. PATENT DOCUMENTS 5,375,760 A * 12/1994 Doko ............................ 228/183
6,261,706 B1 * 7/2001 Fukuda et al. ................ 428/654
(Continued)

FOREIGN PATENT DOCUMENTS

| EP | 1 580 286 | 9/2005 |
| GB | 485292 | 5/1938 |

(Continued)

OTHER PUBLICATIONS

Machine Translation, Ozaki et al., JP 2005-232507, Sep. 2005.*
(Continued)

*Primary Examiner* — Michael E La Villa
(74) *Attorney, Agent, or Firm* — Morgan, Lewis & Bockius LLP (57) ABSTRACT

An aluminum alloy brazing sheet including: a core material made of an aluminum alloy; and a cladding material clad on at least one side of the core material and made of an aluminum alloy having a potential lower than that of the core material. The cladding material is an outermost layer of the brazing sheet, wherein the cladding material is made of an aluminum alloy including 0.2 to 2.0 wt % of Mg, 0.5 to 1.5 wt % of Si, 1.0 to 2.0 wt %, preferably 1.4-1.8% of Mn, ≤0.7 wt % of Fe, ≤0.1 wt % of Cu, and ≤4 wt % of Zn, ≤0.3 wt % each of Zr, Ti, Ni, Hf, V, Cr, In, Sn and ≤0.5 wt % total of Zr, Ti, Ni, Hf, V, Cr, In, Sn, the remainder being Al and unavoidable impurities.

32 Claims, 2 Drawing Sheets

(51) Int. Cl.
  *B32B 15/20* (2006.01)
  *C22C 21/10* (2006.01)
  *C22C 21/00* (2006.01)
  *C22C 21/06* (2006.01)
  *C22C 21/08* (2006.01)
  *F28F 19/06* (2006.01)
  *F28F 21/08* (2006.01)

(52) U.S. Cl.
  CPC .............. *B32B 15/043* (2013.01); *B32B 15/20* (2013.01); *C22C 21/00* (2013.01); *C22C 21/06* (2013.01); *C22C 21/08* (2013.01); *F28F 19/06* (2013.01); *F28F 21/084* (2013.01); *F28F 21/089* (2013.01); *Y10T 428/12063* (2015.01); *Y10T 428/12438* (2015.01); *Y10T 428/12736* (2015.01); *Y10T 428/12764* (2015.01); *Y10T 428/2495* (2015.01); *Y10T 428/24967* (2015.01)

(56) References Cited

U.S. PATENT DOCUMENTS

| | | | |
|---|---|---|---|
| 6,555,251 B2 | 4/2003 | Kilmer | |
| 7,387,844 B2 | 6/2008 | Ueda et al. | |
| 2004/0185293 A1* | 9/2004 | Syslak et al. | 428/654 |
| 2005/0095447 A1* | 5/2005 | Baumann et al. | 428/654 |
| 2006/0134451 A1 | 6/2006 | Saisho et al. | |
| 2006/0141282 A1 | 6/2006 | Ueda et al. | |

FOREIGN PATENT DOCUMENTS

| | | |
|---|---|---|
| JP | 07-041919 | 2/1995 |
| JP | 2003-268470 | 9/2003 |
| JP | 2004-217983 | 8/2004 |
| JP | 2005-505421 | 2/2005 |
| JP | 2005-232507 | 9/2005 |

OTHER PUBLICATIONS

Machine Translation, Ueda et al., JP 2003-268470, Sep. 2003.*
"More About Aluminum and Aluminum Alloys," from www.rose-hulman.edu, downloaded on Mar. 21, 2014, dated 2002 (no month), 4 pages.*
Machine Translation, Sugiyama et al., JP 07-041919, Feb. 1995.*
Office Action (and English translation) in Japanese Application No. 2012-510779, dated Feb. 4, 2014.
International Search Report of PCT/SE2010/050526 dated Aug. 31, 2010.
Office Action in Mexican Application No. Mx/a/2011/010869, dated Feb. 19, 2014.
Office Action (with English Translation) in Japanese Application No. 2012-510779 dated Oct. 28, 2014.

* cited by examiner

ALUMINIUM BRAZING SHEET WITH A HIGH STRENGTH AND EXCELLENT CORROSION PERFORMANCE

RELATED APPLICATION DATA

This application is a §371 National Stage Application of PCT International Application No. PCT/SE2010/050526 filed May 12, 2010, and claims priority under 35 U.S.C. §119 and/or §365 to Swedish Application No. 0950340-0 filed May 14, 2009 both of which are incorporated by reference in their entirety.

TECHNICAL FIELD

The present invention relates an aluminium alloy brazing sheet with high strength and excellent corrosion performance.

BACKGROUND

Down-gauging of radiator tube materials puts tough demands on the materials mechanical properties, internal and external corrosion performance, and compatibility between the different components in the radiator when submitted to a brazing operation close to the melting point of aluminium.

Previous attempts have been made to improve the corrosion resistance of brazing sheets by adding Zn and Mg to the coolant side cladding, or waterside cladding. The prior art has been focused on the effect of Mg on the strength and Zn has been added in high amounts to provide the sacrificial anode effect. It has been found that Zn is undesirable in higher amounts since for thinner tube materials, and depending on the brazing operation Zn can diffuse too deep into the core and, as a consequence the corrosion resistance of the whole brazing sheet will be inferior causing pre-stage leakage and failure mode of the end-product.

U.S. Pat. No. 7,387,844 discloses a brazing sheet having a sacrificial cladding material with 2 to 9 weight % of Zn, at least one selected from the group consisting of 0.3 to 1.8 weight % of Mn and 0.04 to 1.2 weight % of Si, and at least one selected from the group consisting of 0.02 to 0.25 weight % of Fe, 0.01 to 0.30 weight % of Cr, 0.005 to 0.15 weight % of Mg, and 0.001 to 0.15 weight % of Cu. This cladding material does not present a sufficient strength and corrosion resistance for thin gauge brazing sheet. It is an object of the present invention to provide a thinner aluminium alloy brazing sheet that has improved strength, and good corrosion resistance on its inner-surface side, which is in contact with a coolant (e.g. water) when being used as a tube or as a header plate for e g heat exchangers, such as in a radiator or heater. It is also an object of the invention to provide a thin brazing sheet material that has a good workability and can be used in situations involving simultaneous severe internal and external corrosive environments, where it significantly enhances the life time by avoiding pre-stage leakage and failure mode from either side

SUMMARY OF THE INVENTION

The present invention relates to an aluminium brazing sheet which comprises a core material and a cladding material formed on one surface of the core material, where the cladding material is made of an aluminium alloy consisting of 0.2-2.0 wt % of Mg, preferably 0.7-1.4 wt % of Mg, most preferably 0.8-1.3 wt % Mg, 0.5 to 1.5 wt % of Si, 1.0-2.0 wt %, preferably 1.4 to 1.8 wt % of Mn, ≤0.1 wt % of Cu, and ≤4 wt % of Zn, ≤0.3 wt % each of Zr, Ti, Ni, Hf, V, Cr, In, Sn and ≤0.5 wt % total of Zr, Ti, Ni, Hf, V, Cr, In, Sn the remainder being Al and unavoidable impurities.

DETAILED DESCRIPTION

It has been found that a brazing sheet, such as the one disclosed in U.S. Pat. No. 7,387,844 (as mentioned above) has a Mg content which is not sufficient to obtain the required strength and corrosion resistance. Also the presence of Cr, Cu and the high Zn content makes the material unsuitable as a waterside cladding. Zn at high levels will decrease the melting point of the cladding and can potentially make the material more brittle causing problems during rolling.

The brazing sheet of the present invention comprises a core of an aluminium alloy, having on one surface a clad which will be directed towards the coolant side of a heat exchanger manufactured from the brazing sheet, and optionally having a brazing clad on the other surface. The coolant side cladding is hereinafter referred to as the waterside cladding, this cladding being an outermost layer of the brazing sheet, directly in contact with the coolant.

The waterside cladding material is made of an aluminium alloy having a corrosion potential lower than that of the core material, and is the outermost waterside layer of the brazing sheet. The waterside cladding material is made of an aluminium alloy consisting of 0.2 to 2.0 wt % of Mg, 0.5 to 1.5 wt % of Si, 1.0 to 2.0 wt %, preferably 1.4-1.8% of Mn, ≤0.7 wt % of Fe, ≤0.1 wt % of Cu, and ≤4 wt % of Zn, ≤0.3 wt % each of Zr, Ti, Ni, Hf, V, Cr, In, Sn and ≤0.5 wt % total of Zr, Ti, Ni, Hf, V, Cr, In, Sn, the remainder being Al and unavoidable impurities.

The cladding material may preferably be made of an aluminium alloy consisting essentially of 0.7 to 1.4 wt % of Mg, 0.5 to 1.5 wt % of Si, 1.4 to 1.8 wt % of Mn, ≤0.7 wt % Fe, ≤0.1 wt % Cu and ≤4 wt % Zn, ≤0.3 wt % each of Zr, Ti, Ni, Hf, V, Cr, In, Sn and ≤0.5 wt % total of Zr, Ti, Ni, Hf, V, Cr, In, Sn the remainder being Al and unavoidable impurities.

The waterside cladding material may also be made of an aluminium alloy consisting essentially of 0.8 to 1.3 wt % of Mg, 0.5 to 1.5 wt % of Si, 1.4 to 1.8 wt % of Mn, ≤0.7 wt % Fe, ≤0.1 wt % Cu and ≤4 wt % Zn, ≤0.3 wt % each of Zr, Ti, Ni, Hf, V, Cr, In, Sn and ≤0.5 wt % total of Zr, Ti, Ni, Hf, V, Cr, in, Sn the remainder being Al and unavoidable impurities. The cladding material may contain ≤0.05-0.3 wt % Zr.

Mn is an element that improves the strength of the waterside cladding material, as well as the resistance to erosion corrosion when for example used as a tube in a heat exchanger. When the Mn content is less than 1.0 wt %, the sufficient amount of Mn for particle induced strengthening cannot be obtained and the number of particles for improved erosion corrosion resistance will be too low and the strength cannot be ensured. When the Mn content is more than 2.0 wt % the workability of the cladding material is deteriorated and too large intermetallic particles may be formed which might affect the fatigue properties negatively. Between 1.4 and 1.8 wt % Mn the desired content of small dispersoids (<0.5 μm) and larger eutectic particles is achieved which provides for improved erosion corrosion resistance. Therefore the Mn content in the waterside cladding material is set to the range of 1.0-2.0, more preferably to 1.4 to 1.8 wt %.

Si improves the strength of the waterside cladding material by reacting with Mn. When the Si content is less than 0.5 wt %, the number of AlMnSi dispersoids formed is insufficient and the improvement of the strength is not sufficient. Si also lowers the melting point of the cladding and therefore needs to be limited to 1.5 wt %. Therefore the Si content in the waterside cladding material is set to the range of 0.5 to 1.5%.

When the Si-content is lowered the corrosion potential is affected such that the clad becomes more noble, thereby achieving a weaker sacrificial effect, which is undesirable. The Si content of the waterside cladding should also be balanced with the Si content of the core, to obtain the desired sacrificial effect. When the Mn content is high (1.4-1.8%) more Si may be required in the cladding material, since some Si is lost by diffusion into the core and reacts with Mn, in the formation of AlMnSi particles.

During brazing Si also diffuses from the waterside cladding into the core and forms AlMnSi-phase dispersoids, so that corrosion attacks are located only in the outermost layer of the core.

Zn is added to the cladding material in order to make the corrosion potential of the cladding material low. In this case, when the Cu content in the cladding material is at impurity level a sufficient sacrifice anode effect can be achieved and the corrosion resistance can be maintained, even if the Zn content in the cladding material is less than 4 wt %. When the thickness of the core material is decreased or the temperature of the brazing process is high or time at high temperature is long, the Zn of the waterside cladding tends to diffuse deep into the core, which may lead to deteriorated corrosion properties of the brazing sheet. The upper limit for the Zn content has therefore been set to 4 wt %, the Zn content preferably being ≤1.4 wt %, more preferably ≤1.1 wt %, most preferably ≤0.4 wt %.

Mg is added to the cladding material to improve strength and to improve corrosion and erosion resistance. When the Mg content is less than 0.2 wt %, the effect on corrosion and strength is not sufficient. If the Mg content exceeds 2.0%, the processability during rolling becomes difficult and the melting point is lowered. If the Mg content is between 0.7-1.4 wt %, or more preferably 0.8-1.3%, the above criteria on strength and processability are fulfilled and also the corrosion properties are improved. The clad layer for corrosion protection using 0.8-1.3 wt. % Mg gives optimum performance to the core alloy. With a content lower than 0.8 wt. % Mg the resistance to pitting corrosion especially in the more acidic OY-water test solution is reduced so that the favourable condition with superficial surface corrosion is less pronounced. The content of magnesium should preferably be kept to 1.3 wt. % or below to avoid the formation of anodic Al3Mg2 or Al8Mg5 particles in grain boundaries at service temperatures above 70° C., thereby eliminating the risk for IGC which is detrimental to aluminium. A higher content than 1.3 wt % magnesium in the clad alloy may reduce the hot rolling processability during the bonding operation of the core and the clad alloy. Furthermore, with a magnesium content higher than 1.3 wt % in the cladding alloy the strain hardening is increased so that on one side the clad sheet could bend during hot rolling due to a non-uniform strain distribution across the sheet thickness. In order to improve recyclability, the clad composition does preferably not contain Ni.

The Cu level must be set low in the waterside cladding since it makes the corrosion resistance inferior since it increases the risk for pitting corrosion. It is therefore set to a maximum content of 0.1 wt %, preferably <0.04 wt %.

The core material of the aluminium alloy brazing sheet contains ≤0.1 wt % Si, preferably ≤0.06 wt % Si, ≤0.35 wt % Mg, from 1.0 to 2.0 wt %, preferably 1.4 to 1.8 wt % Mn, from 0.2 to 1.0, preferably 0.6 to 1.0 wt % Cu, ≤0.7 wt % Fe, and, ≤0.3 wt % each of Zr, Ti, Ni, Hf, V, Cr, In, Sri and ≤0.5 wt % total of Zr, Ti, Ni, Hf, V, Cr, In, Sn, the balance consisting of aluminium and unavoidable impurities.

The core material preferably contains ≤0.1 wt % Si, preferably ≤0.06 wt % Si, ≤0.35 wt % Mg, from 1.4 to 1.8 wt % Mn, from 0.6 to 1.0 wt % Cu, ≤0.7 wt % Fe, 0.05 to 0.3 wt % Zr, and ≤0.3 wt % each of Ti, Ni, Hf, V, Cr, In, Sn and ≤0.5 wt % total of Zr, Ti, Ni, Hf, V, Cr, In, Sn, the balance consisting of aluminium and unavoidable impurities. The core material and the cladding material are preferably both free from Ni.

Mn in the core increases the strength both in solid solution and when present in particles. At a Mn content in the core of at least 1.0 wt % a large number of particles can be precipitated during preheating and subsequent hot rolling, and a substantial potential gradient between the core and waterside cladding can be obtained because of the large difference of Mn in solid solution after brazing. The term pre-heating refers to heating of the ingot prior to hot-rolling at a temperature not higher than 550° C. Above 2.0 wt % Mn large eutectic particles can be formed during casting, which is undesirable in manufacture of thinner tubes. A Mn content of 1.8 wt % or less is desired since primary particles formed during casting will be smaller. Between 1.4 and 1.8 wt % Mn the desired content of small dispersoids and larger eutectic particles is achieved.

The addition of 0.2-1.0 wt % Cu is made to further increase the strength, since copper is a strengthening agent in aluminium when in solid solution. Also, an appreciable ageing response by heat treatment or during use of the brazed product is expected. However, Cu increases the hot crack sensitivity during casting, decreases the corrosion resistance and the solidus temperature is lowered. A copper content of 0.6-1.0 is preferred in cases where higher strengths are required.

An addition of Zr causes an increased number of very fine particles, which is beneficial for sagging resistance. This also provides for larger grains after brazing which is beneficial for the corrosion properties. In order to obtain a good sagging resistance and large grains 0.05-0.3 wt % Zr can preferably be added to the core and/or to the waterside alloy.

The concentration of silicon in the core should be ≤0.1 wt % Si, preferably ≤0.06 wt % This causes any corrosion attack to proceed in the lateral direction whereby pitting corrosion is avoided and the corrosion attack becomes lateral. Above 0.1 wt % the formation of a sacrificial layer is significantly hindered.

When manufacturing an aluminium alloy for use in a brazing sheet according to the present invention, it is impossible to avoid small amounts of impurities. These impurities are not mentioned, nor left out, in the present invention, but will never exceed 0.15 weight % in total. In all embodiments and examples of the present invention the balance consists of aluminium.

The brazing sheet of the present invention, provides high strength and superior corrosion performance from both the waterside cladding and the braze cladding side. The waterside cladding material is particularly suitable to be applied as a corrosion protective coating on such a core material, due to the adapted corrosion potential between the core and cladding The alloy combination makes it possible to make thinner tube materials with sufficient strength and corrosion properties. The brazing sheet advantageously has a thickness of 300 μm, more preferably 200 μm, and the thickness of the waterside clad is preferably ≤30 μm, more preferably less than 20 μm.

It is very important to carefully choose the composition ranges of the different alloying elements of the brazing sheet.

Hence, the present invention provides a means for controlling the potential gradients and corrosion properties of the brazing sheet by the use of carefully elaborated contents of Mg, Mn, Si, Cu, Zr and optionally Zn. In this way the thickness of the waterside cladding can be minimized, while a high strength and a high corrosion and erosion resistance is maintained. It is desired to obtain a well balanced improved corrosion performance to meet both the external corrosive situation of vehicles exposed to de-icing salt conditions, and situations with bad quality coolants at the interior side, without relying only on the zinc effect in controlling the corrosion mechanism of the sacrificial waterside clad layer.

Any aluminium braze alloy of the 4XXX-series can be used within the scope of the invention. Thus, the thickness of the braze cladding and the type of the braze cladding, used in the examples of this invention are only to be interpreted as examples.

The core and waterside cladding both have high Mn contents in order to provide a high strength of the brazing sheet. By carefully controlling the difference in Si content in the two materials, a potential gradient is achieved whereby the waterside cladding will be sacrificial to the core. During brazing, the Si in the waterside cladding keeps the amount of solute Mn low mainly in the waterside cladding, by stabilising and possibly forming new alfa-AlMnSi dispersoids so that after brazing there will be a difference in solid solution of Mn in the core and in the waterside cladding. The low Si content in the core allows for a high solute content of Mn since most fine AlMn dispersoid particles formed during processing of the sheet will be dissolved during brazing. This provides for a potential gradient to be formed; a property which is not sensitive to braze cycle or cladding thickness. The ratio of Si in the cladding to Si in the core should advantageously be at least 5:1, preferably at feast 10:1. With thin brazing sheet and thinner waterside claddings the silicon content of the waterside should therefore preferably be 0.5 wt % or more to ensure that sufficient Si is available to maintain a high level of alfa-AlMnSi dispersoids during brazing. Zn can be added to the waterside cladding to increase the potential gradient further if necessary and make the waterside cladding corrode sacrificially even faster in the surface layer if desired. The present invention however allows the zinc content of the sacrificial clad layer to be applied at lower levels, reducing the negative impact of zinc diffusing deep into the core thereby making the total corrosion performance inferior from the external side. Such a product with reduced zinc content is also beneficial for the recyclability of heat exchanger products, and it also allows for a more flexible production of different types of heat exchangers in the same CAB brazing furnace. This in combination with the effect of copper, maintained at very low levels in the waterside cladding and having a high copper content in the core will enhance the corrosion potential differences further and thereby improve the corrosion performance beside the effect of silicon and manganese.

When Mg is added to the waterside cladding, the strength of the cladding increases, which contributes to the total strength of the brazing sheet. Due to the relatively high mechanical strength of the clad that is thus obtained, the total thickness of the brazing sheet can be kept at a minimum. It has also been discovered in the present invention that Mg in the waterside cladding reduces the pit depth under corrosive environments.

In some applications the brazeability can be impaired when Mg is present in the system. For other geometries than round welded tubes such as folded tubes, the brazeability of the B-shape tube joints could possibly be negatively affected by the Mg in the waterside cladding.

To achieve this, the present invention provides for a multiple alloying action, where the silicon content of the sacrificial layer, i.e. the waterside cladding, and the core is playing an important role and therefore balanced such that a high silicon content of the sacrificial waterside clad layer, in combination with a very low silicon content of the core will result in a corrosion potential difference after a brazing operation. The potential gradient is mainly achieved due to differences in the solute contents of Mn, Cu and possibly Zn (if present) between the cladding and the core. The Si contents in the core and in the claddings have been carefully selected in order to achieve an optimal performance. The Si-content in the core is kept as low as possible in order to avoid the formation of alfa-AlMnSi-containing dispersoids during brazing. This in combination with the effect of copper, maintained at very low levels in the waterside cladding and having a high copper content in the core will enhance the corrosion potential differences further and thereby improve the corrosion performance beside the effect of silicon and manganese.

Furthermore, the waterside cladding has large grains and a high number of intermetallic particles, which make it withstand erosion from flowing liquid. This is obtained by the high content of Mn and the processing route. The core slab and the clad slab is manufactured in a process comprising preheating after casting to no more than 550° C. The erosion properties are important for tubes when a flowing liquid is present in the system, as for example in a radiator or a heater core. The waterside cladding of the present invention is especially tailored to be erosion resistant. The erosion resistance is dependent on particle fraction and size distribution; particles containing Al—Si—Fe—Mn in a controlled number is beneficial for the material to withstand erosive action. The waterside alloy of the present invention has an adapted particle area fraction. The area fraction in the as brazed condition is dependent on composition, process, and braze cycle. This is achieved by the method according to the present invention for producing AlMn sheets in which a waterside cladding rolling slab is produced from a melt which contains (in weight-percent) 0.5-1.5% Si, 1.0 to 2.0% preferably 1.4-1.8% of Mn, 0.2-0.2% Mg, ≤0.1% Cu, ≤0.7% Fe, ≤1.4%, ≤4% preferably ≤1.4 wt %, more preferably ≤1.1 wt %, most preferably ≤0.4 wt % Zn, ≤0.3 wt % each of Zr, Ti, Ni, Hf, V, Cr, In, Sn and ≤0.5 wt % total of Zr, Ti, Ni, Hf, V, Cr, In, Sn, the balance consisting of aluminium and unavoidable impurities. All amounts of alloying elements hereafter given are in weight percent. The rolling slab is prior to hot rolling preheated at a preheating temperature of less than 550° C. to control the number and size of dispersoid particles (particles precipitated from supersaturated solid solution), whereafter the preheated rolling slab is hot rolled into a hot strip to appropriate dimensions. Normal total hot rolling height reduction of the waterside strip thickness is dependent on final gauge and thickness of waterside cladding, but is typically >70%. The hot strip exit gauge for the waterside cladding is typically in the range from 25 to 100 mm. It is welded onto a core slab which has been produced from a melt which contains <0.1%, preferably <0.06% Si, 1.0 to 2.0% preferably 1.4-1.8% of Mn, ≤0.35% Mg, ≤0.2-1.0%, preferably 0.6-1.0% Cu, ≤0.7% Fe, ≤0.3 wt % each of Zr, Ti, Ni, Hf, V, Cr, In, Sn and wt % total of Zr, Ti, Ni, Hf, V, Cr, In, Sn, the balance consisting of aluminium and unavoidable impurities. The clad slab is preheated at a preheating temperature of less than 550° C. It is hot-rolled and further cold-rolled to final gauge. The coil is preferably temper annealed at final gauge. The waterside cladding material then has a microstructure after brazing comprising a number density of particles in the range between 0, 5 and $20 \times 10^5$ particles per $mm^2$, preferably between 1 and 12×10$^5$ particles per mm$^2$, most preferably between 2 and 9×10$^5$ particles per mm$^2$ the particles having an equivalent diameter in the range of 50-500 nm, and a number density of particles in the range between 1-20×10$^3$ particles per mm$^2$, preferably between 7 and 15×10$^3$ particles per mm$^2$ the particles having an equivalent diameter in the range of >500 nm. The majority of these fine particles are created during the preheating prior to hot rolling. Typical brazing conditions include heating to a temperature of 580-630° C., e.g. about 600° C., with a dwell time of 2-5 minutes, typically around 3 minutes. A description on how the particle density was measured is described in Example 2.

The brazing sheet may have an Al—Si braze clad applied directly to it on the opposite side from the cladding, said braze clad comprising 5-13 wt % Si. When the core has a braze cladding on the opposite side of the waterside cladding, the low silicon content in the core provides for a sacrificial layer to be formed and corrosion proceeds only in the lateral direction also on the braze cladding side. The excellent corrosion resistance of this core material has previously been shown in EP1580286. When the brazing sheet includes a braze clad, no intermediate layer is needed on the brazing side of the brazing sheet, which is an advantage from an economical point of view. Recycling of the material is also made easier when no intermediate layer with a composition different to that of the core is used.

The corrosion protection of a brazing sheet including a braze clad is excellent because of potential gradients created at both the inner and outer sides. At the outer surface, facing the air-side, a sacrificial anodic long-life layer is created during brazing at a sub-surface level. Fine particles in the core that contain Al, Mn, and Si are precipitated close to the braze clad surface due to inward diffusion of Si from the braze cladding. This lowers the Mn in solid solution in this zone compared to the core. At larger depths of the core were silicon does not reach most of AlMn fine dispersoid particles are dissolved during the brazing operation and the amount of solute Mn is increased. This difference in solute Mn between the sacrificial anodic sub-surface layer after brazing operation results in a potential gradient between the outer surface and the core giving an excellent corrosion performance.

Also the process for producing such a brazing sheet has been optimised in order to reach the best performance of the brazing sheet. The final profile of Mn, Cu, and Si in solid solution, and thereby its corrosion protection, after brazing is dependent on the process history of the sheet.

The ingot of the brazing sheet is only pre-heated <550° C., prior to hot-rolling. This process route is chosen in order to produce a core material with a large amount of Mn-containing dispersoids that are sufficiently small to dissolve during brazing and thereby maximise the amount of Mn in solid solution. Temper H24 is also preferred compared to temper H14. It has been found that the potential gradient from the outer, braze cladding side, is sharper when the material is produced in temper H24.

Therefore, the temper of the core of the aluminium alloy brazing sheet according to the invention preferably is H24, and the core slab and the clad slab are advantageously manufactured in a process comprising preheating after casting to no more than 550° C. Hereinafter embodiments of the present invention will be described by way of example.

EXAMPLES

Example 1

Material sheet specimens A-D were made by using a core with a composition given in Table 1 below. Hot-rolled material of said core material was used which was originally clad with 10% AA4343 braze cladding and 10% waterside cladding thickness. The waterside cladding was removed and replaced with other waterside alloy claddings, according to the compositions in Table 2. Specimens A and C are comparative examples. The material package thickness was further reduced by cold-rolling in a lab-mill to the appropriate dimensions and was subjected to a final heat-treatment to temper H24.

TABLE 1

The chemical composition of the core, in wt-%, measured by OES.

| | Si | Fe | Cu | Mn | Mg | Zn | Zr | Ti |
|---|---|---|---|---|---|---|---|---|
| Core | 0.05 | 0.2 | 0.80 | 1.7 | <0.01 | <0.01 | 0.13 | 0.03 |

TABLE 2

The chemical composition of the waterside alloys, in wt-%, measured by OES.

| Specimen | Si | Fe | Cu | Mn | Mg | Zn | Zr | Ti |
|---|---|---|---|---|---|---|---|---|
| A | 0.8 | 0.2 | <0.01 | 1.7 | <0.01 | <0.01 | <0.01 | <0.01 |
| B | 0.8 | 0.2 | <0.01 | 1.7 | 1.1 | <0.01 | <0.01 | <0.01 |
| C | 0.8 | 0.2 | <0.01 | 1.6 | <0.01 | 2.7 | <0.01 | <0.01 |
| D | 0.8 | 0.2 | <0.01 | 1.6 | 1.1 | 2.7 | <0.01 | <0.01 |

All specimens were braze simulated in a CAB batch furnace. The sheets were placed in pairs with the waterside claddings facing each other to minimise zinc evaporation. A thermal cycle was used, which included raising the temperature from room temperature to 600° C. in 20 min, 3 min dwell time at the maximum temperature, and thereafter cooling to 200° C. in either of two different cooling procedures, see Table 3. The cooling atmosphere was air or N$_2$. Although the cooling rate is arbitrary, it is desirable that the cooling rate is quick. The different material combinations and brazing procedures are given in Table 4. As already mentioned all specimens comprise the core given in Table 1, a AA4343 braze cladding, and a waterside cladding as given in Table 2. The gauge and cladding thicknesses were measured by Light Optical Microscopy on polished samples.

TABLE 3

Braze cycles.

| Braze cycle no | Heating time (min) | Maximum temperature (° C.) | Dwell time at temperature (min) | Cooling rate down to 200° C. (° C./sec) | Cooling atmosphere |
|---|---|---|---|---|---|
| I | 20 | 600 | 2 | 2.4 | air |
| II | 20 | 600 | 2 | 1.4 | N$_2$ |

TABLE 4

Material combinations and brazing scheme.

| Specimen | Waterside cladding | Total thickness (μm) | Waterside cladding thickness (μm) | Braze cladding thickness (μm) | Braze cycle no |
|---|---|---|---|---|---|
| A1 | A | 210 | 22 | 11 | I |
| B1 | B | 190 | 19 | 10 | I |
| C1 | C | 202 | 20 | 11 | I |

TABLE 4-continued

Material combinations and brazing scheme.

| Specimen | Waterside cladding | Total thickness (μm) | Waterside cladding thickness (μm) | Braze cladding thickness (μm) | Braze cycle no |
|---|---|---|---|---|---|
| D1 | D | 205 | 19 | 12 | I |
| A2 | A | 210 | 22 | 11 | II |
| B2 | B | 190 | 19 | 10 | II |
| D2 | D | 205 | 19 | 12 | II |

The internal corrosion behaviour was evaluated using a beaker test. Test coupons of 40×80 mm were prepared from each material combination. They were degreased in a mild alkaline degreasing bath (Candoclene). The back sides were masked with adhesive tape. Four test coupons were immersed in each glass beaker containing 400 ml OY-water solution. The OY-water composition was 195 ppm $Cl^-$, 60 ppm $SO_4^{2-}$, 1 ppm $Cu^{2+}$, and 30 ppm $Fe^{3+}$. It was prepared using NaCl, $Na_2SO_4$, $CuCl_2.2H_2O$, and $FeCl_3.6H_2O$ in deionised water. The beaker was placed on a hot-plate with magnetic stirring which could be adjusted with a timer. The temperature cycle was set at 88° C. for 8 hours and room temperature for 16 hours. Stirring was applied during the 8 hour heating periods only. The test was performed over a two week period using the same test-solution throughout. Duplicate samples of each material combination were analysed. After testing, the coupons were immersed in $HNO_3$ for 10-15 minutes and rinsed in deionised water. Pit depth analysis was made using the Microscopy Method according to ISO 11463. Cross-sections were studied in a light optical microscope for a more detailed analysis of the type of corrosive attack and the pit depth. Perforations were counted if present, but any perforations closer than 5 mm to the edges were omitted.

Table 5 shows the results from internal corrosion testing. The number of perforations (total on two test coupons) are given. No perforations were found.

Table 6 shows the pit depth of specimens A1-D1 and A3-D3. B1, B2, D1, and D2 are within the scope of this invention, and A1, A2 and C1 are comparative specimens.

TABLE 5

Number of perforations after two weeks internal corrosion test.

| Specimen | Waterside cladding | Gauge (μm) | Waterside cladding thickness (μm) | Number of perforations |
|---|---|---|---|---|
| A1 | A | 210 | 22 | 0 |
| B1 | B | 190 | 19 | 0 |
| C1 | C | 202 | 20 | 0 |
| D1 | D | 205 | 19 | 0 |
| A2 | A | 210 | 22 | 0 |
| B2 | B | 190 | 19 | 0 |
| D2 | D | 205 | 19 | 0 |

TABLE 6

Pit-depth results from the focusing method after two weeks of internal corrosion testing.

| Sample | Waterside cladding | Average pit depth (μm) | Standard dev. (μm) |
|---|---|---|---|
| A1 | A | 110 | 28 |
| B1 | B | 78 | 20 |
| C1 | C | 136 | 29 |

TABLE 6-continued

Pit-depth results from the focusing method after two weeks of internal corrosion testing.

| Sample | Waterside cladding | Average pit depth (μm) | Standard dev. (μm) |
|---|---|---|---|
| D1 | D | 70 | 11 |
| A2 | A | 136 | 33 |
| B2 | B | 70 | 17 |
| D2 | D | 49 | 14 |

Figure 1:
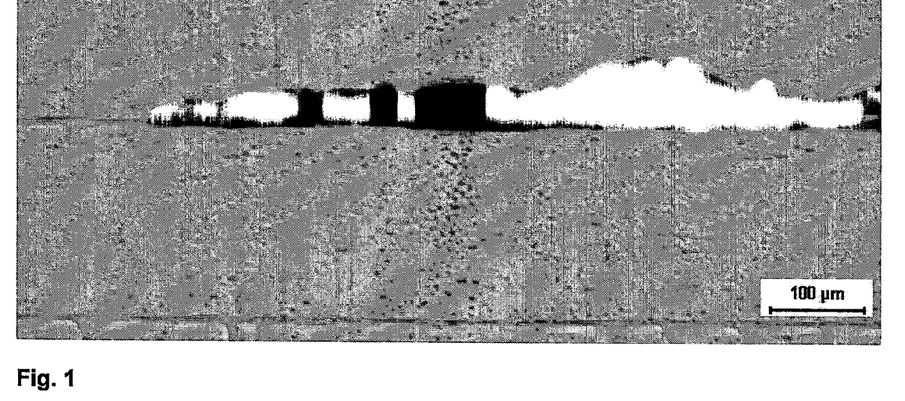
FIGS. 1 and 2 show materials C1 and D1 after internal corrosion testing.
Figure 2:
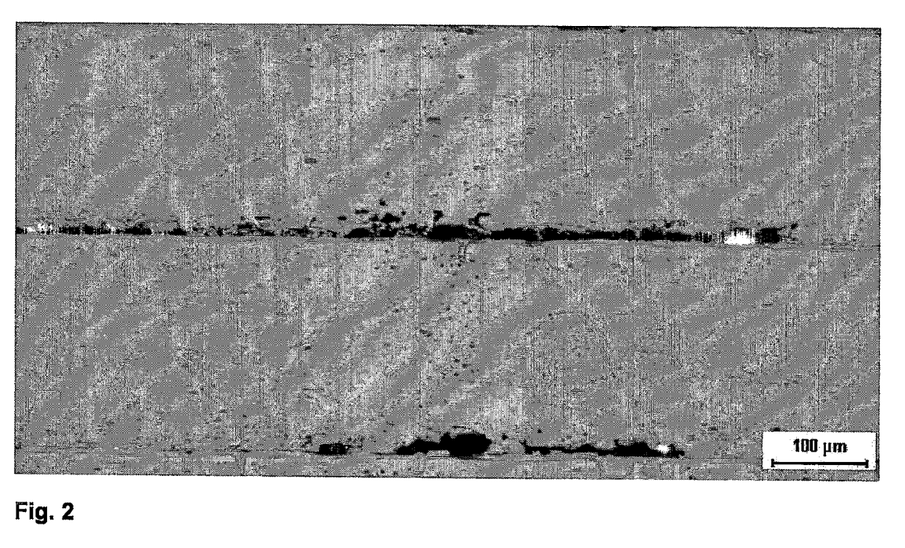

As can be seen in Table 6, B1 and B2 have a smaller pit-depth than A1 and A2. D1 and D2 have smaller pit-depth than C1. It is clear that the addition of magnesium to the waterside cladding reduces the pit depth. This is also shown in the cross-sections in FIGS. 1 and 2 which show materials C1 and D1 after internal corrosion testing. A potential gradient between the waterside cladding and core of this invention is sufficient for materials A and C to withstand perforation in internal corrosion test. The corrosion performance is, however, much enhanced with the addition of Mg to the waterside cladding. A combination of a strong core and waterside cladding, that has enhanced pitting corrosion characteristics provides for thinner material dimensions.

The corrosion potential profiles were measured on both temper H24 and temper H14 material, from the braze cladding side, after CAB brazing as given above. Corrosion potential measurements were made at 6-8 depths, starting from the outer surface of the residual braze cladding and progressing into the core. The samples were etched in hot NaOH to the different depths (backside was masked with adhesive tape). After etching, the samples were cleaned in conc. $HNO_3$ and rinsed in deionised water and ethanol. The thickness of each sample was measured by a micrometer before and after etching to determine the depth.

The test coupons were masked using adhesive tape on the back side and nail varnish to cover the edges. The active area after masking was ~20×30 mm. The electrochemical measurements were performed using a Solartron IMP process logger. A Standard Calomel Electrode (SCE) was used as reference electrode. The samples were immersed in a SWAAT solution electrolyte (ASTM D1141 without heavy metals at pH 2.95). 10 ml of $H_2O_2$ per liter electrolyte solution was added at the start of the measurements. The open circuit potential (OCP) was monitored as a function of depth by etching samples prior to measurement.

Figure 3:
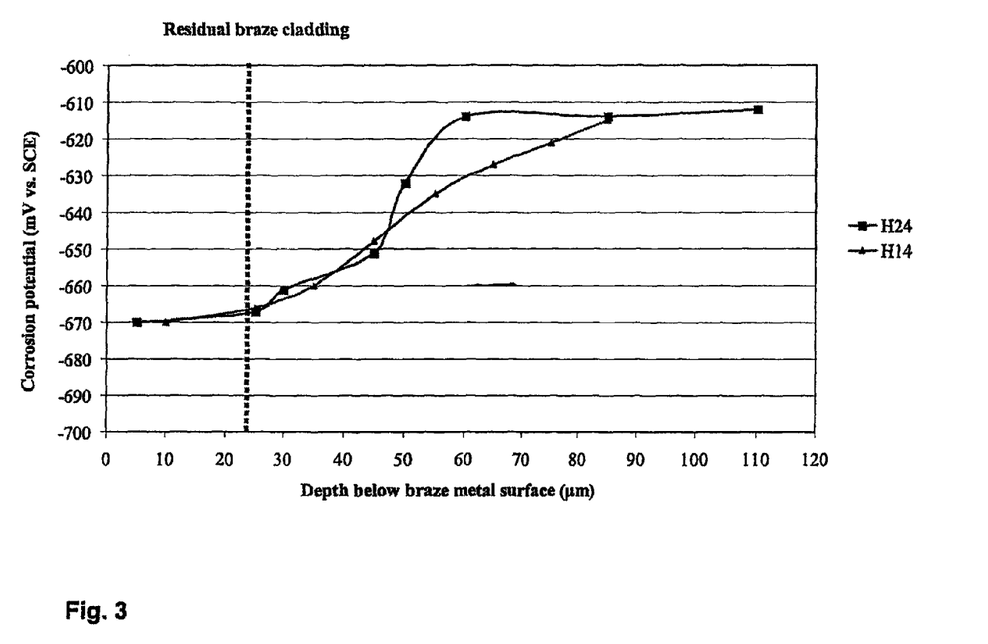
FIG. 3 shows corrosion potential profiles.

The corrosion potential profiles are shown in FIG. 3. It can be seen that temper H24 material provides a steeper corrosion potential profile than temper H14 material.

Example 2

Another aspect of the present invention is the particle area distribution. Material with a core composition according to Table 1 and waterside cladding E from Table 7, was used for analysis. The Mg content is not likely to influence the particle density to a large extent. The waterside cladding ingot was pre-heated at a temperature between 450 and 550° C. and the slab was hot-rolled with a total reduction of 90%. The waterside slab was welded onto the core ingot; on the opposite side a AA4343 braze cladding slab was welded. The package was at a temperature <550° C. and hot-rolled with a total reduction of 99% to 3.9 mm. The slab was further reduced to final gauge 0.270 mm by cold-rolling. The coil was temper annealed to temper H24.

TABLE 7

The chemical composition of the waterside alloy, in wt-%, measured by OES.

| Specimen | Si | Fe | Cu | Mn | Mg | Zn | Zr | Ti |
|---|---|---|---|---|---|---|---|---|
| E | 0.9 | 0.3 | <0.01 | 1.6 | <0.01 | 1.6 | 0.1 | <0.01 |

Material from the coil described above was braze simulated in a CAB batch furnace. Two thermal cycles were used: one which included raising the temperature from room temperature to 610° C. in 20 min, followed by a dwell time of 3 minutes at the maximum temperature. A second thermal cycle was used similar to the previous, but with a maximum temperature of 585° C. Cooling was performed under inert atmosphere a rate of ~0.50° C./s.

To measure the particle density of the material sections were cut in the longitudinal, ND-RD, plane of the strip. The sections were mechanically polished using Struers OP-S suspension, containing 0.04 µm colloidal silica, in the fast preparation step. The area cross-sections of the particles were measured in a FEG-SEM, Philips XL30S, using an image analysis system from Oxford Instruments, IMQuant/X.

Images for the measurements were recorded in the backscatter mode using the "in-lens" detector in the microscope. In order to minimize the information depth and to get a good spatial resolution in the backscatter image, a low acceleration voltage, 3 kV, was used. Common grey level threshold was used to detect the particles. In order to obtain a result that is representative of the number and distribution of the particles in the sample, the measured image frames were spread over the cross section. Measurements were made in two steps. The first was made of smaller dispersoids (particles with an equivalent diameter <500 nm). More than 1000 dispersoids were measured. The area, A, of each particle is measured and an equivalent particle diameter is calculated as $\sqrt{4A/\pi}$. The second measurement was made on constituent particles (particles with an equivalent diameter >500 nm). The measurement was made on an image field covering around 80% of the cladding thickness. 100 such image fields were analysed.

The sample had after brazing at 610° C. for 2 min a number density of dispersoids within the size range 50-500 nm of $3.9 \times 10^5$ particles per mm². The samples had after brazing a number density of constituent particles within the size range >500 nm of $1.4 \times 10^4$ particles per mm². The sample had after brazing at 585° C. for 2 min a number density of dispersoids within the size range 50-500 nm of $6.8 \times 10^5$ particles per mm². The samples had after brazing a number density of constituent particles within the size range >500 nm of $1 \times 10^4$ particles per mm².

The invention claimed is:

1. An aluminium alloy brazing sheet comprising:
   a core material made of an aluminium alloy containing less than or equal to 0.1 wt. % of Si; and
   a cladding material clad on at least one side of the core material and made of an aluminium alloy having a corrosion potential lower than that of the core material, the cladding material being an outermost layer of the brazing sheet,
   wherein the cladding material is made of an aluminium alloy consisting of
      0.8 to 1.3 wt. % of Mg,
      0.5 to 1.5 wt. % of Si,
      1.0 to 2.0 wt. % of Mn,
      less than or equal to 0.7 wt. % of Fe,
      less than or equal to 0.1 wt. % of Cu,
      less than or equal to 4 wt. % of Zn,
      less than or equal to 0.3 wt. % each of Zr, Ti, Ni, Hf, V, Cr, In, and Sn,
      less than or equal to 0.5 wt. % total of Zr, Ti, Ni, Hf, V, Cr, In, and Sn, and
      the remainder being Al and unavoidable impurities.

2. The aluminium alloy brazing sheet according to claim 1, wherein the cladding material contains 0.05 to 0.3 wt. % Zr.

3. The aluminium alloy brazing sheet according to claim 2, wherein the cladding material contains less than or equal to 1.4 wt. % of Zn.

4. The aluminium alloy brazing sheet according to claim 1, wherein the clad composition does not contain Ni.

5. The aluminium alloy brazing sheet according to claim 1, wherein the copper content of the cladding is less than 0.04 wt. %.

6. The aluminium alloy brazing sheet according to claim 1,
   wherein the core material consists of
      less than or equal to 0.1 wt. % Si,
      less than or equal to 0.35 wt. % Mg,
      from 1.0 to 2.0 wt. % Mn,
      from 0.2 to 1.0 wt. % Cu,
      less than or equal to 0.7 wt. % Fe, and
      less than or equal to 0.3 wt. % each of Zr, Ti, Ni, Hf, V, Cr, In, and Sn,
      less than or equal to 0.5 wt. % total of Zr, Ti, Ni, Hf, V, Cr, In, and Sn, and
      the balance consisting of aluminium and unavoidable impurities.

7. The aluminium alloy brazing sheet according to claim 6, wherein, in the core material, the amount of Si is less than or equal to 0.06 wt. %.

8. The aluminium alloy brazing sheet according to claim 6, wherein, in the core material, the amount of Mn is 1.4 to 1.8 wt. % Mn.

9. The aluminium alloy brazing sheet according to claim 6, wherein, in the core material, the amount of Cu is 0.6 to 1.0 wt. %.

10. The aluminium alloy brazing sheet according to claim 1,
    wherein the core material consists of
       less than or equal to 0.1 wt. % Si,
       less than or equal to 0.35 wt. % Mg,
       from 1.4 to 1.8 wt. % Mn,
       from 0.6 to 1.0 wt. % Cu,
       less than or equal to 0.7 wt. % Fe,
       0.05 to 0.3 wt. % Zr, and
       less than or equal to 0.3 wt. % each of Ti, Ni, Hf, V, Cr, In, and Sn,
       less than or equal to 0.5 wt. % total of Zr, Ti, Ni, Hf, V, Cr, In, and Sn, and
       the balance consisting of aluminium and unavoidable impurities.

11. The aluminium alloy brazing sheet according to claim 1, wherein the core material and the cladding material are both free from Ni.

12. The aluminium brazing sheet according to claim 1, wherein said cladding material is a waterside cladding, and wherein the core has an additional Al—Si braze clad directly applied to it on the opposite side from the cladding, said blaze clad comprising 5-13 wt. % Si.

13. The aluminium alloy brazing sheet according to claim 1, wherein the ratio of Si in the cladding material to Si in the core is at least 5:1 based on weight.

14. The aluminium alloy brazing sheet according to claim 1, wherein the thickness of the brazing sheet is less than 300 pm.

15. The aluminium alloy brazing sheet according to claim 14, wherein the thickness of the clad is less than or equal to 30 pm.

16. The aluminium alloy brazing sheet according to claim 15, wherein the thickness of the clad is less than 20 pm.

17. The aluminium alloy brazing sheet according to claim 14, wherein the thickness of the brazing sheet is less than 200 pm.

18. The aluminium alloy brazing sheet according to claim 1, wherein the temper of the core is H24.

19. The aluminium alloy brazing sheet according to claim 1, wherein it is made from a core slab and a clad slab, said core slab and clad slab being manufactured in a process comprising preheating after casting to no more than 550° C.

20. The aluminium alloy brazing sheet according to claim 1, wherein the cladding material contains less than or equal to 1.4 wt. % of Zn.

21. The aluminium alloy brazing sheet according to claim 1, wherein the cladding material contains less than or equal to 1.1 wt. % of Zn.

22. The aluminium alloy brazing sheet according to claim 1, wherein the cladding material contains less than or equal to 0.4 wt. % of Zn.

23. The aluminium alloy brazing sheet according to claim 1, wherein the cladding material contains 1.6 to 1.7 wt. % Mn.

24. The aluminium alloy brazing sheet according to claim 1, wherein the cladding material contains not less than 1.4 and up to 1.8 wt. % of Mn.

25. An aluminium alloy brazing sheet, comprising:
a core material made of an aluminium alloy; and
a cladding material clad on at least one side of the core material and made of an aluminium alloy having a corrosion potential lower than that of the core material, the cladding material being an outermost layer of the brazing sheet,
wherein the cladding material is made of an aluminium alloy consisting of
0.8 to 1.3 wt. % of Mg,
0.5 to 1.5 wt. % of Si,
1.0 to 2.0 wt. % of Mn,
less than or equal to 0.7 wt. % of Fe,
less than or equal to 0.1 wt. % of Cu,
less than or equal to 4 wt. % of Zn,
less than or equal to 0.3 wt. % each of Zr, Ti, Ni, Hf, V, Cr, In, and Sn,
less than or equal to 0.5 wt. % total of Zr, Ti, Ni, Hf, V, Cr, In, and Sn, and
the remainder being Al and unavoidable impurities, and
wherein the cladding material has a microstructure after brazing comprising a number density of particles in the range between $0.5 \times 10^5$ and $20 \times 10^5$ particles per mm$^2$ the particles having an equivalent diameter in the range of 50-500 nm, and a number density of particles in the range between $1 \times 10^3$ and $20 \times 10^3$ particles per mm$^2$ the particles having an equivalent diameter in the range of greater than 500 nm.

26. The aluminium alloy brazing sheet according to claim 25, wherein the number density of particles with the equivalent diameter in the range of 50-500 nm is in the range between $1 \times 10^5$ and $12 \times 10^5$ particles per mm$^2$.

27. An aluminium alloy brazing sheet, comprising:
a core material made of an aluminium alloy; and
a cladding material clad on at least one side of the core material and made of an aluminium alloy having a corrosion potential lower than that of the core material, the cladding material being an outermost layer of the brazing sheet,
wherein the cladding material is made of an aluminium alloy consisting of
0.8 to 1.3 wt. % of Mg,
0.5 to 1.5 wt. % of Si,
1.0 to 2.0 wt. % of Mn,
less than or equal to 0.7 wt. % of Fe,
less than or equal to 0.1 wt. % of Cu,
less than or equal to 4 wt. % of Zn,
less than or equal to 0.3 wt. % each of Zr, Ti, Ni, Hf, V, Cr, In, and Sn,
less than or equal to 0.5 wt. % total of Zr, Ti, Ni, Hf, V, Cr, In, and Sn, and
the remainder being Al and unavoidable impurities, and
wherein the ratio of Si in the cladding material to Si in the core is at least 10:1 based on weight.

28. An aluminium alloy brazing sheet comprising:
a core material made of an aluminium alloy containing less than or equal to 0.1 wt. % of Si; and
a cladding material clad on at least one side of the core material and made of an aluminium alloy having a corrosion potential lower than that of the core material, the cladding material being an outermost layer of the brazing sheet,
wherein the cladding material is made of an aluminium alloy consisting of
0.8 to 1.3 wt. % of Mg,
0.5 to 1.5 wt. % of Si,
1.0 to 2.0 wt. % of Mn,
less than or equal to 0.7 wt. % of Fe,
less than or equal to 0.1 wt. % of Cu,
less than or equal to 4 wt. % of Zn,
0.05 to 0.3 wt. % Zr,
less than or equal to 0.3 wt. % each of Ti, Ni, Hf, V, Cr, In, and Sn,
less than or equal to 0.5 wt. % total of Zr, Ti, Ni, Hf, V, Cr, In, and Sn, and
the remainder being Al and unavoidable impurities.

29. The aluminium alloy brazing sheet according to claim 28,
wherein the core material consists of
less than or equal to 0.1 wt. % Si,
less than or equal to 0.35 wt. % Mg,
from 1.0 to 2.0 wt. % Mn,
from 0.2 to 1.0 wt. % Cu,
less than or equal to 0.7 wt. % Fe, and
less than or equal to 0.3 wt. % each of Zr, Ti, Ni, Hf, V, Cr, In, and Sn,
less than or equal to 0.5 wt. % total of Zr, Ti, Ni, Hf, V, Cr, In, and Sn, and
the balance consisting of aluminium and unavoidable impurities.

30. The aluminium alloy brazing sheet according to claim 28, wherein the temper of the core is H24.

31. The aluminium alloy brazing sheet according to claim 28, wherein the cladding material contains less than or equal to 1.4 wt. % of Zn.

32. An aluminium alloy brazing sheet, comprising:
a core material made of an aluminium alloy; and
a cladding material clad on at least one side of the core material and made of an aluminium alloy having a corrosion potential lower than that of the core material, the cladding material being an outermost layer of the brazing sheet,
wherein the cladding material is made of an aluminium alloy consisting of
0.8 to 1.3 wt. % of Mg,
0.5 to 1.5 wt. % of Si, 1.0 to 2.0 wt. % of Mn,
less than or equal to 0.7 wt. % of Fe,
less than or equal to 0.1 wt. % of Cu,
less than or equal to 4 wt. % of Zn,
0.05 to 0.3 wt. % Zr,
less than or equal to 0.3 wt. % each of Ti, Ni, Hf, V, Cr, In, and Sn,
less than or equal to 0.5 wt. % total of Zr, Ti, Ni, Hf, V, Cr, In, and Sn, and
the remainder being Al and unavoidable impurities, and wherein the cladding material has a microstructure after brazing comprising a number density of particles in the range between $0.5 \times 10^5$ and $20 \times 10^5$ particles per $mm^2$ the particles having an equivalent diameter in the range of 50-500 nm, and a number density of particles in the range between $1 \times 10^3$ and $20 \times 10^3$ particles per $mm^2$ the particles having an equivalent diameter in the range of greater than 500 nm.

* * * * *